United States Patent
Ranson et al.

(10) Patent No.: US 8,953,724 B2
(45) Date of Patent: Feb. 10, 2015

(54) CANCELING NARROWBAND INTERFERING SIGNALS IN A DISTRIBUTED ANTENNA SYSTEM

(71) Applicant: Andrew LLC, Hickory, NC (US)

(72) Inventors: Christopher Goodman Ranson, Concord, VA (US); Gregory Allan Maca, Lynchburg, VA (US); Thomas Kummetz, Kissing (DE)

(73) Assignee: Andrew LLC, Hickory, NC (US)

( * ) Notice: Subject to any disclaimer, the term of this patent is extended or adjusted under 35 U.S.C. 154(b) by 5 days.

(21) Appl. No.: 13/929,081

(22) Filed: Jun. 27, 2013

(65) Prior Publication Data

US 2014/0003561 A1    Jan. 2, 2014

Related U.S. Application Data

(60) Provisional application No. 61/690,451, filed on Jun. 27, 2012.

(51) Int. Cl.
| | |
|---|---|
| *H03D 1/04* | (2006.01) |
| *H03D 1/06* | (2006.01) |
| *H03K 5/01* | (2006.01) |
| *H03K 6/04* | (2006.01) |
| *H04B 1/10* | (2006.01) |
| *H04L 25/08* | (2006.01) |

(52) U.S. Cl.
CPC ..................................... *H04B 1/109* (2013.01)
USPC .......................................... 375/346; 375/285

(58) Field of Classification Search
USPC .......................................................... 375/346
See application file for complete search history.

(56) References Cited

U.S. PATENT DOCUMENTS

| | | |
|---|---|---|
| 5,325,204 A | 6/1994 | Scarpa |
| 5,694,082 A | 12/1997 | Schmidt |

(Continued)

FOREIGN PATENT DOCUMENTS

| | | |
|---|---|---|
| WO | 2010056850 A2 | 5/2010 |
| WO | 2010056850 A3 | 7/2010 |

OTHER PUBLICATIONS

Hogenauer, "An Economical Class of Digital Filters for Decimation and Interpolation", IEEE Transactions on Acoustics, Speech, and Signal Processing, Apr. 1981, pp. 155-162, vol. ASSP-29, No. 2, IEEE, 8 pages.

*Primary Examiner* — Erin File
(74) *Attorney, Agent, or Firm* — Kilpatrick Townsend & Stockton LLP

(57) ABSTRACT

Canceling narrowband interfering signals in a distributed antenna system is provided. In one aspect, a cancellation sub-system includes a decimator module, a filter, an interpolator module, and a combiner module coupled to the uplink path and a reference path in parallel with the uplink path. The reference path includes the decimator module, the filter, and the interpolator module. The decimator module decimates a reference signal sampled from an uplink signal traversing an uplink path of the remote antenna unit. Each of the uplink signal and the reference signal includes a narrowband interfering signal component. The filter generates a cancellation signal from the reference signal by attenuating the reference signal outside a frequency band that includes the interfering signal component. The interpolator module interpolates the cancellation signal to a sampling rate of the uplink signal. The combiner module can subtract the cancellation signal from the uplink signal.

20 Claims, 16 Drawing Sheets

(56) References Cited

U.S. PATENT DOCUMENTS

| | | |
|---|---|---|
| 5,892,757 A * | 4/1999 | Norrell et al. ............... 370/292 |
| 6,704,378 B2 | 3/2004 | Jagger et al. |
| 6,745,003 B1 | 6/2004 | Maca et al. |
| 6,807,405 B1 | 10/2004 | Jagger et al. |
| 7,317,698 B2 | 1/2008 | Jagger et al. |
| 7,525,942 B2 | 4/2009 | Cordone |
| 2003/0021367 A1 * | 1/2003 | Smith ........................... 375/346 |
| 2004/0228426 A1 * | 11/2004 | Oh et al. ...................... 375/346 |
| 2010/0118921 A1 | 5/2010 | Abdelmonem et al. |
| 2010/0150033 A1 * | 6/2010 | Zinser et al. ................. 370/278 |
| 2011/0320194 A1 * | 12/2011 | Shlomot et al. .............. 704/205 |
| 2014/0177620 A1 * | 6/2014 | Montreuil et al. ............ 370/347 |

* cited by examiner

| SIR(dB) | BEP | RMS EVM (%) |
|---|---|---|
| -10 | 0.3392 | 316.2 |
| -8 | 0.3296 | 251.1 |
| -6 | 0.3174 | 199.5 |
| -4 | 0.3015 | 158.5 |
| -2 | 0.2804 | 125.9 |
| 0 | 0.2498 | 100.0 |
| 2 | 0.1507 | 79.4 |
| 4 | 0 | 63.1 |
| 6 | 0 | 50.1 |
| 8 | 0 | 39.8 |
| 10 | 0 | 31.6 |
| 12 | 0 | 25.1 |
| 14 | 0 | 20.0 |
| 16 | 0 | 15.9 |
| 18 | 0 | 12.6 |
| 20 | 0 | 10.0 |
| 22 | 0 | 8.0 |
| 24 | 0 | 6.4 |
| 26 | 0 | 5.1 |
| 28 | 0 | 4.1 |
| 30 | 0 | 3.3 |

FIG. 4

| SIR | BEP with no filter | RMS EVM with no filter | BEP Notch Enabled | RMS EVM Notch Enabled |
|---|---|---|---|---|
| -10 dB | 0.339 | 316.2 % | $1.27 \times 10^{-3}$ | 32.4 % |
| -8 dB | 0.330 | 251.1 % | $7.04 \times 10^{-4}$ | 30.4 % |
| -6 dB | 0.317 | 199.5 % | $4.33 \times 10^{-4}$ | 29.0 % |
| -4 dB | 0.302 | 158.5 % | $2.83 \times 10^{-4}$ | 28.1 % |
| -2 dB | 0.280 | 125.9 % | $1.93 \times 10^{-4}$ | 27.5 % |
| 0 dB | 0.250 | 100.0 % | $1.38 \times 10^{-4}$ | 27.1 % |
| 2 dB | 0.151 | 79.4 % | $1.23 \times 10^{-4}$ | 26.9 % |
| 4 dB | 0.00 | 63.1 % | $1.05 \times 10^{-4}$ | 26.7 % |
| 6 dB | 0.00 | 50.1 % | $9.27 \times 10^{-5}$ | 26.6 % |
| 8 dB | 0.00 | 39.8 % | $8.26 \times 10^{-5}$ | 26.6 % |
| 10 dB | 0.00 | 31.6 % | $7.76 \times 10^{-5}$ | 26.5 % |
| 12 dB | 0.00 | 25.1 % | $7.76 \times 10^{-5}$ | 26.5 % |
| 14 dB | 0.00 | 20.0 % | $6.76 \times 10^{-5}$ | 26.5 % |
| 16 dB | 0.00 | 15.9 % | $6.76 \times 10^{-5}$ | 26.5 % |
| 18 dB | 0.00 | 12.6 % | $6.76 \times 10^{-5}$ | 26.5 % |
| 20 dB | 0.00 | 10.0 % | $6.01 \times 10^{-5}$ | 26.5 % |
| 22 dB | 0.00 | 8.0 % | $6.51 \times 10^{-5}$ | 26.5 % |
| 24 dB | 0.00 | 6.4 % | $6.51 \times 10^{-5}$ | 26.5 % |
| 26 dB | 0.00 | 5.1 % | $6.01 \times 10^{-5}$ | 26.5 % |
| 28 dB | 0.00 | 4.1 % | $6.76 \times 10^{-5}$ | 26.5 % |
| 30 dB | 0.00 | 3.3 % | $6.01 \times 10^{-5}$ | 26.5 % |

FIG. 18

CANCELING NARROWBAND INTERFERING SIGNALS IN A DISTRIBUTED ANTENNA SYSTEM

CROSS-REFERENCE TO RELATED APPLICATION

Claim of priority is made to U.S. Provisional Application Ser. No. 61/690,451, filed Jun. 27, 2012 and titled "Methods for Canceling Narrowband Interfering signals for a Distributed Antenna System," the contents of which are hereby incorporated by reference.

TECHNICAL FIELD

This disclosure relates generally to telecommunication systems, and more particularly relates to canceling narrowband interfering signals in a distributed antenna system.

BACKGROUND

A distributed antenna system ("DAS") may be used to extend wireless coverage into structures where RF penetration directly from the base station is limited. A DAS can communicate signals between a base station and remote antenna units positioned in the structure being serviced by the DAS. The DAS may communicate signals from multiple technologies in the same band. For example, the DAS may communicate signals in the same frequency band used by both a Global System for Mobile Communications ("GSM") standard and a wideband CDMA ("WCDMA") standard.

A mobile device may be positioned in the area serviced by the DAS. The mobile device may be serviced by an external base station for an operator that does not communicate via the DAS. The external base station may communicate with the mobile device may communicate via a telecommunication technology utilizing the same frequencies in an uplink frequency band as utilized by the DAS. The mobile device may be close to a remote antenna unit of the DAS and distant from the external base station. The mobile device may transmit uplink signals to the external base station at high power levels to overcome path loss caused by the distance between the remote antenna unit and the external base station. The mobile device transmitting uplink signals to the external base station at high power levels can overdrive a receiver of the remote antenna unit. A narrowband GSM signal may overdrive a receiver of a remote antenna unit. Overdriving the receiver of a remote antenna unit can cause inter-modulation distortion, thereby degrading channels adjacent to a narrowband GSM channel.

Prior solutions for handling narrowband interfering signals have involved reducing the gain of the receiver in overdriven remote antenna units until the intermodulation or other distortion is reduced to an acceptable level. Such solutions can present disadvantages, such as increasing the noise figure of the receiver. Increasing the noise figure of the receiver for one or more remote antenna units can desensitize the receiver for other mobile devices being serviced by the DAS.

SUMMARY

Certain aspects and features of the present invention are directed to canceling narrowband interfering signals in a distributed antenna system.

In one aspect, a cancellation sub-system is provided for canceling narrowband interfering signal components in a remote antenna unit of a distributed antenna system. The cancellation sub-system includes a decimator module, a filter coupled to the decimator module, an interpolator module coupled to the filter, and a combiner module coupled to the uplink path and a reference path in parallel with the uplink path. The reference path includes the decimator module, the filter, and the interpolator module. The decimator module can decimate a reference signal sampled from an uplink signal traversing an uplink path of the remote antenna unit. Each of the uplink signal and the reference signal includes a narrowband interfering signal component. The filter can generate a cancellation signal from the reference signal by attenuating frequency components of the reference signal using a passband corresponding to a frequency band that includes the narrowband interfering signal component. The interpolator module can interpolate the cancellation signal to a sampling rate of the uplink signal traversing the uplink path. The combiner module can subtract the cancellation signal from the uplink signal.

In another aspect, a remote antenna unit is provided that is configured for canceling narrowband interfering signal components in a distributed antenna system. The remote antenna unit can include a receiver and a cancellation sub-system communicatively coupled to the receiver. The receiver can receive an uplink signal traversing an uplink path. The uplink signal can include a narrowband interfering signal component. The cancellation sub-system includes a decimator module, a filter coupled to the decimator module, an interpolator module coupled to the filter, and a combiner module coupled to the uplink path and a reference path in parallel with the uplink path. The reference path includes the decimator module, the filter, and the interpolator module. The decimator module can decimate a reference signal sampled from an uplink signal traversing an uplink path of the remote antenna unit. The reference signal includes the narrowband interfering signal component. The filter can generate a cancellation signal from the reference signal by attenuating frequency components of the reference signal using a passband corresponding to a frequency band that includes the narrowband interfering signal component. The interpolator module can interpolate the cancellation signal to a sampling rate of the uplink signal traversing the uplink path. The combiner module can subtract the cancellation signal from the uplink signal.

In another aspect, a method is provided for canceling narrowband interfering signal components in a remote antenna unit of a distributed antenna system. The method involves a receiver of the remote antenna unit receiving an uplink signal traversing an uplink path of the remote antenna unit. The method further involves decimating a reference signal sampled from the uplink signal. Each of the uplink signal and the reference signal includes a narrowband interfering signal component. The method further involves generating a cancellation signal from the reference signal by attenuating frequency components of the reference signal using a passband corresponding to a frequency band that includes the narrowband interfering signal component. The method further involves interpolating the cancellation signal to a sampling rate of the uplink signal traversing the uplink path. The method further involves subtracting the cancellation signal from the uplink signal.

These illustrative aspects and features are mentioned not to limit or define the invention, but to provide examples to aid understanding of the concepts disclosed in this application. Other aspects, advantages, and features of the present invention will become apparent after review of the entire application.

BRIEF DESCRIPTION OF THE DRAWINGS

FIG. 4 is a table depicting example bit error probabilities and root mean square ("RMS") error vector magnitudes for different signal-to-interferer ratios in the absence of interference cancellation according to one aspect of the present invention.

FIG. 18 is a table depicting example bit error probabilities and RMS error vector magnitudes associated with different signal-to-interferer ratios for a cancellation sub-system according to one aspect of the present invention.

DETAILED DESCRIPTION

Figure 1:
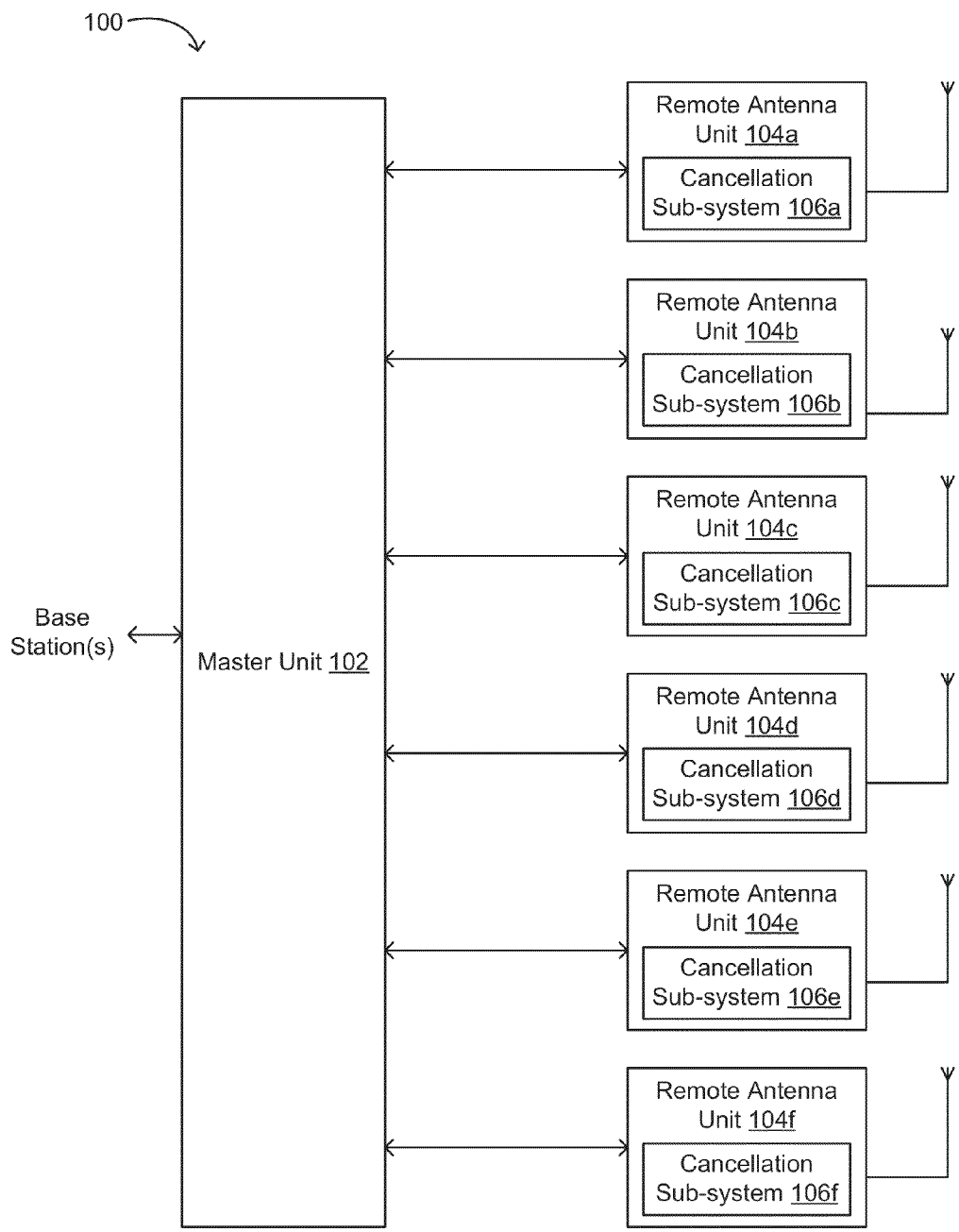
FIG. 1 is a block diagram of a distributed antenna system including remote antenna units having cancellation sub-systems for canceling narrowband interfering signals according to one aspect of the present invention.

Certain aspects and features of the present invention are directed to canceling narrowband interfering signals in a distributed antenna system.

In accordance with some aspects, a cancellation system can generate a narrowband cancellation signal for removing from an uplink signal a frequency band including an interfering signal. The cancellation system can be disposed in an uplink path of a remote antenna unit. The cancellation system can include a reference signal path in parallel with an uplink signal path. Uplink signals can traverse the uplink signal paths. A reference signal can be sampled from the uplink signal path and provided to the reference path. The reference path can include a decimator, a filter, and an interpolator. The decimator can decimate the reference signal to a lower sampling rate such that the sampling rate of the decimated reference signal is the minimum sampling rate that can satisfy the Nyquist rate.

The filter disposed in the reference path can generate a cancellation signal by isolating a frequency band that includes the interfering signal from the decimated reference signal. Non-limiting examples of suitable filters include a low-pass linear phase filter and a bandpass filter. The decimation of the reference signal by the decimator can allow the filter to generate a cancellation signal in a narrow frequency band. Generating a cancellation signal in a narrow frequency band can reduce or eliminate distortion of the uplink signal caused by cancellation of the frequency band including the narrowband interfering signal component. The filter can remove any signal components at frequencies outside the narrow frequency band that includes the interfering signal. The output of the filter may be a cancellation signal in the narrow frequency band.

A combiner disposed in the uplink path and coupled to the reference path can subtract the cancellation signal traversing the reference path from the uplink signal traversing the uplink path. Subtracting the cancellation signal from the uplink signal can remove, from the frequency spectrum of the uplink signal, a narrow frequency band that includes the interfering signal. Removing the narrow frequency band can remove the interfering signal as well as a narrow portion of the uplink signal. The interpolator can prepare the cancellation signal to be subtracted from the uplink signal by interpolating the cancellation signal such that the sampling rate of the cancellation signal is equal to the sampling rate of the uplink signal traversing the uplink path.

Complex mixers can be included in the reference path or the uplink path. In some aspects, a first complex mixer can down-convert the reference signal from an initial center frequency to DC (i.e., 0 Hz) to generate a cancellation signal. A second complex mixer can up-convert the cancellation signal to the initial center frequency prior to subtracting the cancellation signal from the uplink signal. In other aspects, the first complex mixer can down-convert both the uplink signal and the reference signal from an initial center frequency to DC (i.e., 0 Hz). The second complex mixer can up-convert the uplink signal to the initial center frequency after the cancellation signal is subtracted from the uplink signal.

In additional or alternative examples, the cancellation system can remove multiple interfering signals within different frequency bands. A respective reference signal can each traverse each of multiple parallel reference paths. Each reference path can be a signal path parallel to the uplink path. Each reference signal traversing a given reference path can be processed to generate a respective cancellation signal corresponding to a respective frequency band including a respective interfering signal. The combiner can subtract the multiple cancellation signals from the uplink signals to remove the multiple interfering signals.

Detailed descriptions of certain aspects are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects but, like the illustrative aspects, should not be used to limit the present invention.

FIG. 1 is a block diagram of an example DAS 100 that includes remote antenna units 104a-f having cancellation sub-systems 106a-f for canceling narrowband interfering signals. The DAS 100 can include a master unit 102 and the remote antenna units 104a-f. The DAS 100 can extend wireless coverage into buildings, tunnels, and/or other structures to augment radio frequency ("RF") penetration from base stations. The DAS 100 can be used to distribute telecommunication signals from one or more operators, in one or more frequency bands, or in one or more telecommunication standards. The master unit 102 can communicate with base stations associated with multiple operators and with the remote antenna units 104a-f in a geographic area serviced by the DAS 100.

In a downlink direction, the master unit 102 can receive downlink signals from one or more base stations. Downlink signals can include signals received from a base station and transmitted to terminal devices (e.g., mobile phones or other communication devices) positioned in a geographical area serviced by the DAS 100. In some aspects, a base station can be co-located with the master unit 102. In other aspects, a base station can communicate with the master unit via a directional antenna. The master unit 102 can down-convert and digitize the downlink signals from the base station(s). The master unit 102 can multiplex the digital downlink signals into frames for transmission over serial links or other suitable communication links to the remote antenna units 104a-f. The master unit 102 can multiplex the digital downlink signals using any suitable process, such as time-division multiplexing ("TDM"), code division multiple access ("CDMA"), etc. The serial links or other suitable communication links between the master unit 102 and the remote antenna units 104a-f can include any suitable communication medium. Non-limiting examples of suitable communication media include fiber optic cables, copper cables, microwave links, etc.

The remote antenna units 104a-f can receive downlink signals from the master unit 102. Each of the remote antenna units 104a-f can split or otherwise separate frequency bands from a downlink signal including multiple frequency bands. Each of the remote antenna units 104a-f can include a digital-to-analog converter ("DAC") that can convert downlink signal data received from the master unit 102 to an analog downlink signal. Each of the remote antenna units 104a-f can up-convert the analog downlink signals to RF for transmission to terminal devices positioned in the area serviced by the DAS 100.

In an uplink direction, each of the remote antenna units 104a-f can down-convert RF uplink signals received from terminal devices to an intermediate frequency ("IF"). Uplink signals can include signals received from terminal devices and transmitted to base stations. Each of the remote antenna units 104a-f can include an analog-to-digital converter ("ADC") that can convert the analog uplink signals received from terminal devices to digital uplink signals. Each of the cancellation sub-systems 106a-f can generate a narrowband cancellation signal for removing a frequency band including an interfering signal from the digital uplink signals. Each of the remote antenna units 104a-f can multiplex the digital uplink signals into frames for transmission to the master unit 102 via the serial links or other suitable communication links. The remote antenna units 104a-f can multiplex the digital uplink signals using any suitable process, such as TDM, CDMA, etc.

The master unit 102 can de-frame the digital uplink data into digital uplink signals. The master unit 102 can include DAC's for converting the digital uplink signals into analog uplink signals. The master unit 102 can up-convert the analog uplink signals from IF to RF for transmission to the base station(s). The master unit 102 can transmit the uplink signals to the base station(s).

Although the DAS 100 is depicted as including a single master unit 102 and six remote antenna units 104a-f, any number of each of the master units 102 and the remote antenna units 104a-f can be used.

Each of the remote antenna units 104a-f can include a wideband receiver configured to receive signals for operating bands and for multiple telecommunication technologies. For example, one or more of the remote antenna units 104a-f may receive uplink signals having frequencies in frequency bands used by a Personal Communications Service ("PCS") system, an Advanced Mobile Phone System ("AMPS"), an Advance Wireless Service ("AWS") system, etc. The receivers of the remote antenna units 104a-f can be optimized for each frequency band. For example, a receiver can include a separate down-converter and up-converter for each frequency band. A filter can be used to pass the usable bandwidth of a respective frequency band. For example, a receiver for a PCS frequency band can pass 65 MHz of the PCS band.

Interfering signals may be present in an area serviced by the DAS 100. Interfering signals may have frequencies in one or more uplink frequency bands. For example, a geographical area may include both wideband CDMA ("WCDMA") telecommunication systems and Global System for Mobile Communications ("GSM") GSM telecommunication systems. GSM telecommunication system may transmit signals having frequencies within one or more frequency bands used by WCDMA telecommunication systems.

Figure 2:
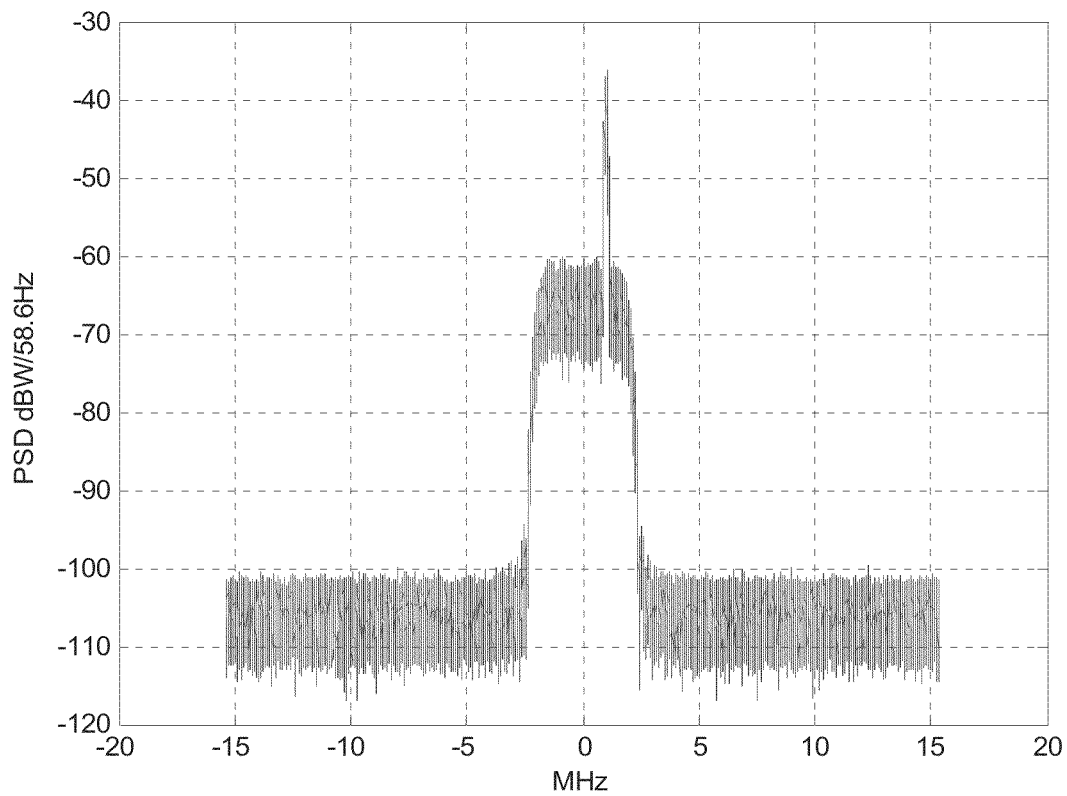
FIG. 2 is a graph depicting an example power spectral density of an uplink signal with an interfering signal according to one aspect of the present invention.
Figure 3:
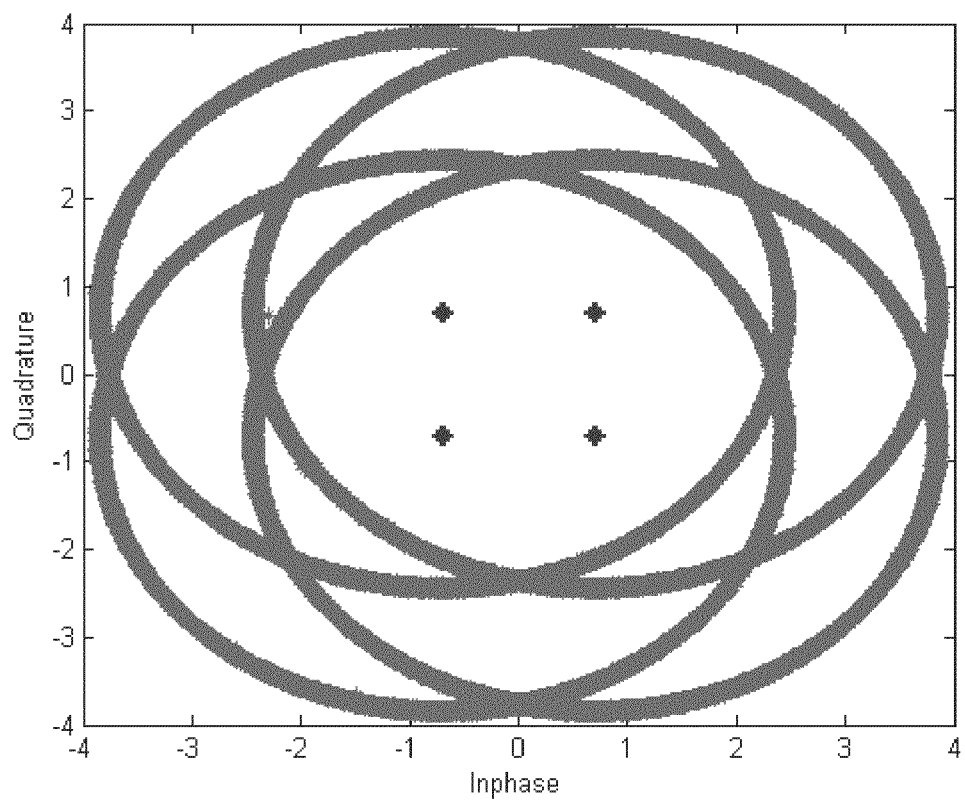
FIG. 3 is an example constellation diagram of an uplink signal with an interfering signal according to one aspect of the present invention.

FIG. 2 is a graph depicting an example power spectral density of an uplink signal with an interfering signal according to one aspect. The power spectral density indicates the distribution of signal power over the different frequency components in the uplink signal. For example, an interfering signal may be a narrowband GSM signal having a frequency within a WCDMA frequency band. In the example depicted in FIG. 2, the power of the GSM interfering signal is 10 dB greater than the power of a WCDMA signal. FIG. 3 is an example constellation diagram depicting the uplink signal with the interfering signal.

Figure 5:
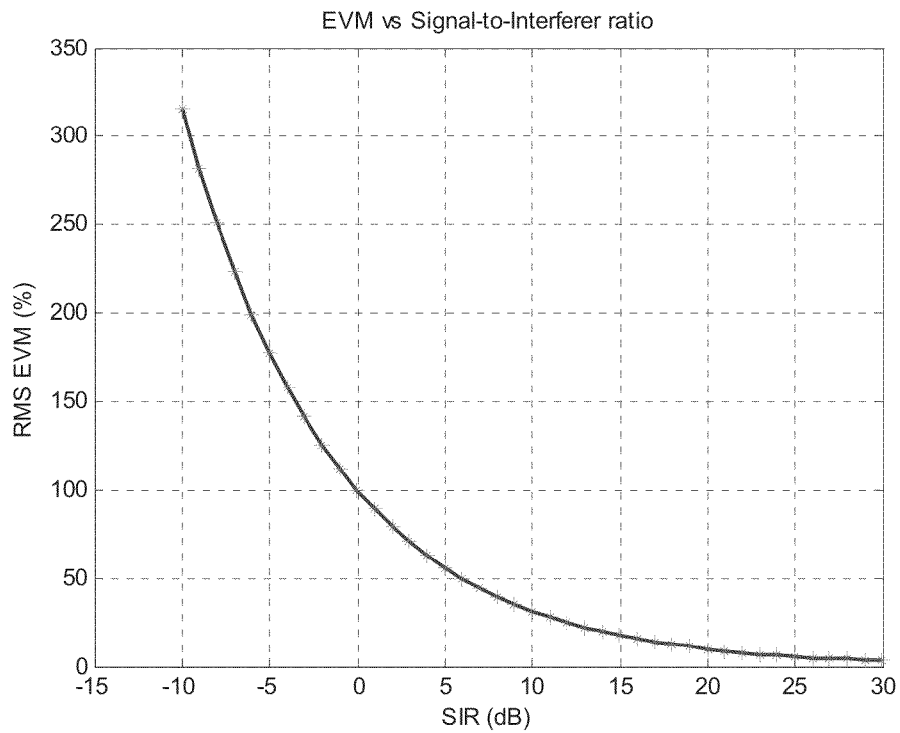
FIG. 5 is a graph depicting example RMS error vector magnitudes versus signal-to-interferer ratios in the absence of interference cancellation according to one aspect of the present invention.
Figure 6:
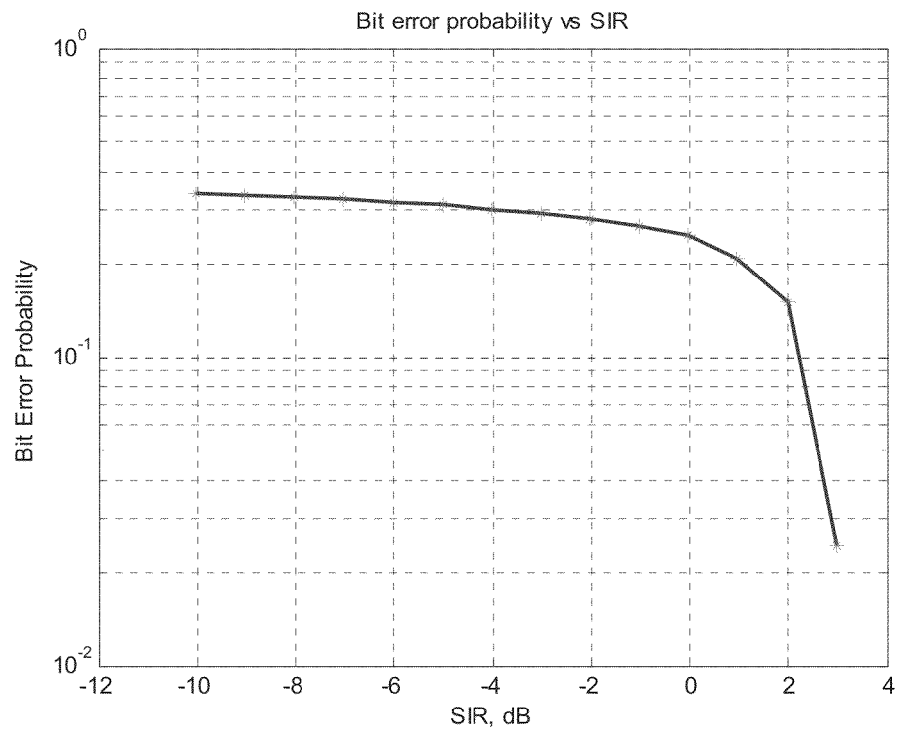
FIG. 6 is a graph depicting example bit error probabilities versus signal-to-interferer ratios in the absence of interference cancellation according to one aspect of the present invention.

FIG. 4 is a table depicting example bit error probabilities and root mean square ("RMS") error vector magnitudes for different signal-to-interferer ratios in the absence of interference cancellation. The signal-to-interferer ratio can include a ratio between the power of the uplink signal to be communicated via the DAS 100 and an interfering signal in an area serviced by the DAS 100. The error vector magnitude can be a measure of signal integrity for a DAS 100. The error vector magnitude can represent the root mean RMS of the length of the error vector as a percentage of the length of the vector to a preferred constellation point for the uplink signal. FIG. 5 is a graph depicting the example RMS error vector magnitudes versus signal-to-interferer ratios from the table in FIG. 4. FIG. 6 is a graph depicting the example bit error probabilities versus signal-to-interferer ratios from the table in FIG. 4.

Figure 7:
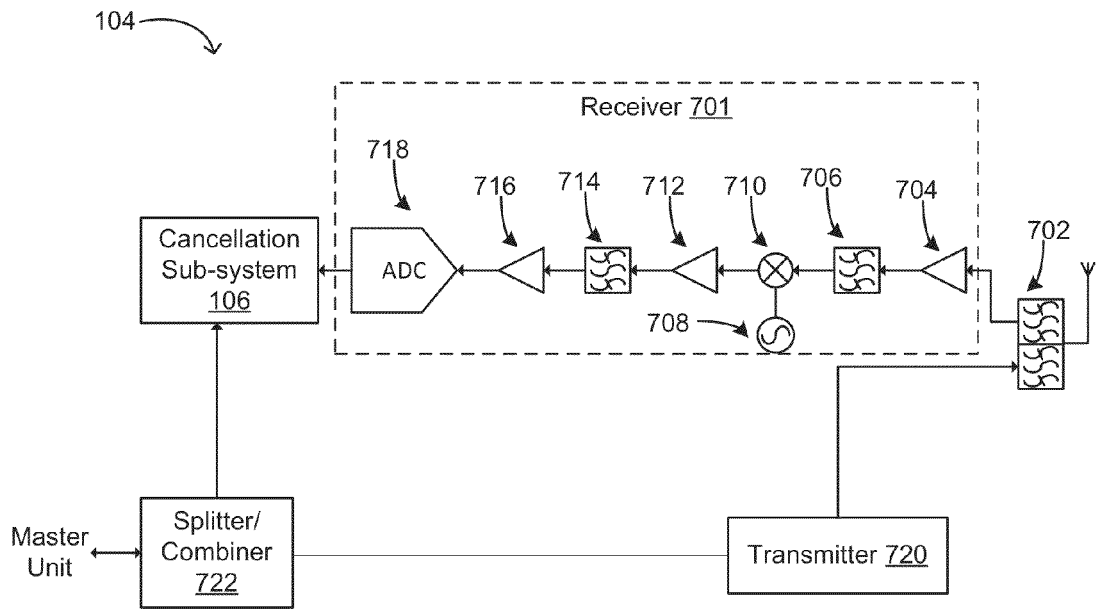
FIG. 7 is a partial schematic diagram depicting an example remote antenna unit having a cancellation subsystem and a receiver according to one aspect of the present invention.

The cancellation sub-systems 106a-f can reduce or eliminate the impact of interfering signals on the performance of the DAS 100. FIG. 7 is a partial schematic diagram depicting an example remote antenna unit 104 having a cancellation subsystem 106 according to one aspect. The remote antenna unit 104 can include the receiver 701, a duplexer 702, a transmitter 720, and a splitter-combiner 722.

The receiver 701 can include a low noise amplifier 704, a filter 706, a local oscillator 708, a mixer 710, a filter 714, an amplifier 716, and an ADC 718. The local oscillator 708 and the mixer 710 can down-convert analog RF uplink signals to IF. For example, the local oscillator 708 and the mixer 710 can down-convert the RF uplink signals such that the IF center frequency is 350 MHz. The ADC 718 can use any suitable sampling rate. A non-limiting example of a suitable sampling rate is 700 MHz.

The duplexer 702 or other multiplexing device can isolate an uplink path including the receiver 701 from a downlink path including the transmitter 720. The splitter-combiner 722 that can connect the uplink and downlink paths to a common port communicatively coupled to the master unit via a serial link or other suitable communication link. The splitter-combiner 722 can receive signals from the master unit 102 and split the to-be-transmitted downlink signals from the uplink signals to be provided to the master unit 102. The splitter-combiner 722 can provide downlink signals to the downlink path and provide uplink signals to the master unit 102.

Figure 8:
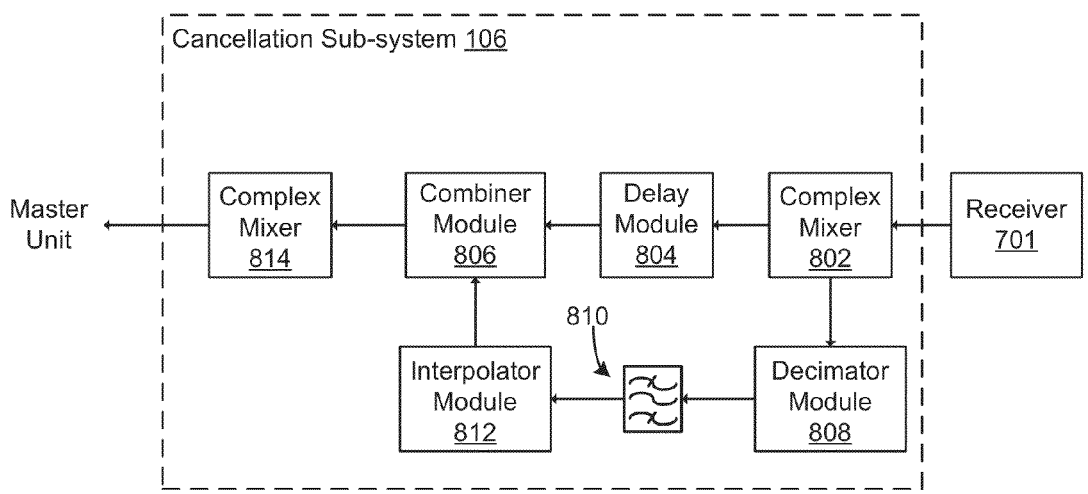
FIG. 8 is a block diagram depicting an example cancellation sub-system according to one aspect of the present invention.

FIG. 8 is a block diagram depicting an example cancellation sub-system 106 according to one aspect. The cancellation sub-system 106 can include an uplink path from the receiver 701 to the master unit 102 and a reference path used to generate a cancellation signal. The uplink path can include complex mixers 802, 814, a delay module 804, and a combiner module 806. The reference path can include a decimator module 808, a filter 810, and an interpolator module 812.

The reference path can be used to sample reference signals from the uplink frequency spectrum and to apply decimation and low-pass filtering to generate cancellation signals for canceling narrowband interfering signals. The reference path can have a relatively flat magnitude and phase response over the bandwidth of the interfering signal.

The complex mixer 802 can receive the digital uplink signal from the receiver 701 and down-convert digital uplink signal. The digital uplink signal can be down-converted such that a frequency band of the uplink signal provided to the reference path is centered at DC (i.e., 0 Hz).

The complex mixer 802 can provide the down-converted digital uplink signal to the delay module 804 in the uplink path. The delay module 804 can delay the uplink signal traversing the uplink path. The delay in the uplink signal traversing the uplink path can match a delay in the reference signal traversing the reference path. The delay of the reference signal with respect to the uplink signal can be caused by the components of the reference path. The amount by which to delay the uplink signal can be the delay from the impulse to the peak of the impulse response of the reference path.

The complex mixer 802 can also provide the down-converted digital uplink signal as a reference signal to the reference path. In the reference path, the decimator module 808 can decimate the reference signal to a lower sampling rate than the uplink signal traversing the uplink path. The sampling rate of the decimated reference signal can be the sampling rate of the reference signal at the input of the decimator module 808 divided by a decimation rate of the decimator module 808. The decimator module 808 can be configured such that the sampling rate of the decimated reference signal is the minimum sampling rate that can satisfy a Nyquist rate so as to reduce or prevent aliasing of the reference signal.

The filter 810 can generate a cancellation signal from the reference signal. The filter 810 can have a passband that includes the frequency band of the interfering signal. The filter 810 can the isolate the interfering signal from the decimated reference signal. For example, the filter 810 may be a low-pass linear phase filter or a bandpass filter that can filter the decimated reference signal to pass the interfering signal. The filter 810 can be configured to have a passband with a bandwidth at or near the bandwidth of an interfering signal, such as the narrowband GSM signal depicted in FIG. 2. The output of the filter 810 may be a cancellation signal corresponding to the frequency band of the interfering signal. The interpolator module 812 can interpolate the cancellation signal outputted from the filter 810 such that the cancellation signal has a sampling rate equal to the uplink signal traversing the uplink path.

The combiner module 806 can receive the cancellation signal traversing the reference path and the uplink signal traversing the uplink path. The combiner module 806 can subtract the cancellation signal from the uplink signal. Subtracting the cancellation signal from the uplink signal can remove a narrow frequency band including the interfering signal from the frequency spectrum of the uplink signal. The decimation of the reference signal to generate the cancellation signal can limit the cancellation operation to the narrow frequency band. Removing the narrow frequency band can remove the interfering signal as well as a narrow portion of the uplink signal. The output of the combiner module 806 can include a modified uplink signal without the portion of the uplink band that includes the interfering signal.

The combiner module 806 can provide the modified uplink signal to the complex mixer 814. The complex mixer 814 can up-convert the modified uplink signal such that the center frequency component of the modified uplink signal at the output of the complex mixer 814 is equal to an initial center frequency component of the digital uplink signal at the input of the complex mixer 802.

Figure 9:
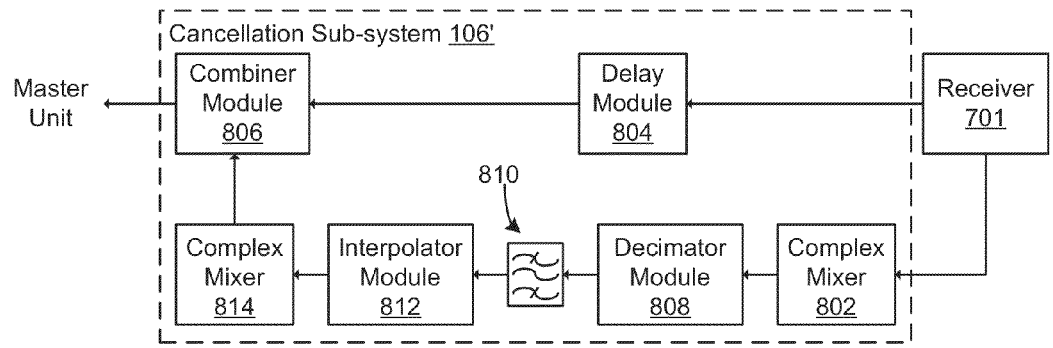
FIG. 9 is a block diagram depicting an alternative cancellation sub-system according to one aspect of the present invention.

Although FIG. 8 depicts the complex mixers 802, 814 in the uplink path from the receiver 701 to the master unit 102, other implementations are possible. In other aspects, the complex mixers 802, 814 can be disposed in the reference path. For example, FIG. 9 is a block diagram depicting an alternative cancellation sub-system 106' according to one aspect. The cancellation sub-system 106' can include an uplink path from the receiver 701 to the master unit and a reference path including the complex mixers 802, 814, the decimator module 808, the filter 810, and the interpolator module 812. The uplink signal from the receiver 701 can be provided to the delay module 804 and the complex mixer 802. The complex mixer 802 can down-convert the reference signal such that the center frequency component of the reference signal is at DC (i.e., 0 Hz). The complex mixer 802 can up-convert the cancellation signal prior to the combiner module 806 subtracting the cancellation signal from the uplink signal. The modified uplink signal from the output of the combiner module 806 can be transmitted to the master unit 102.

Figure 10:
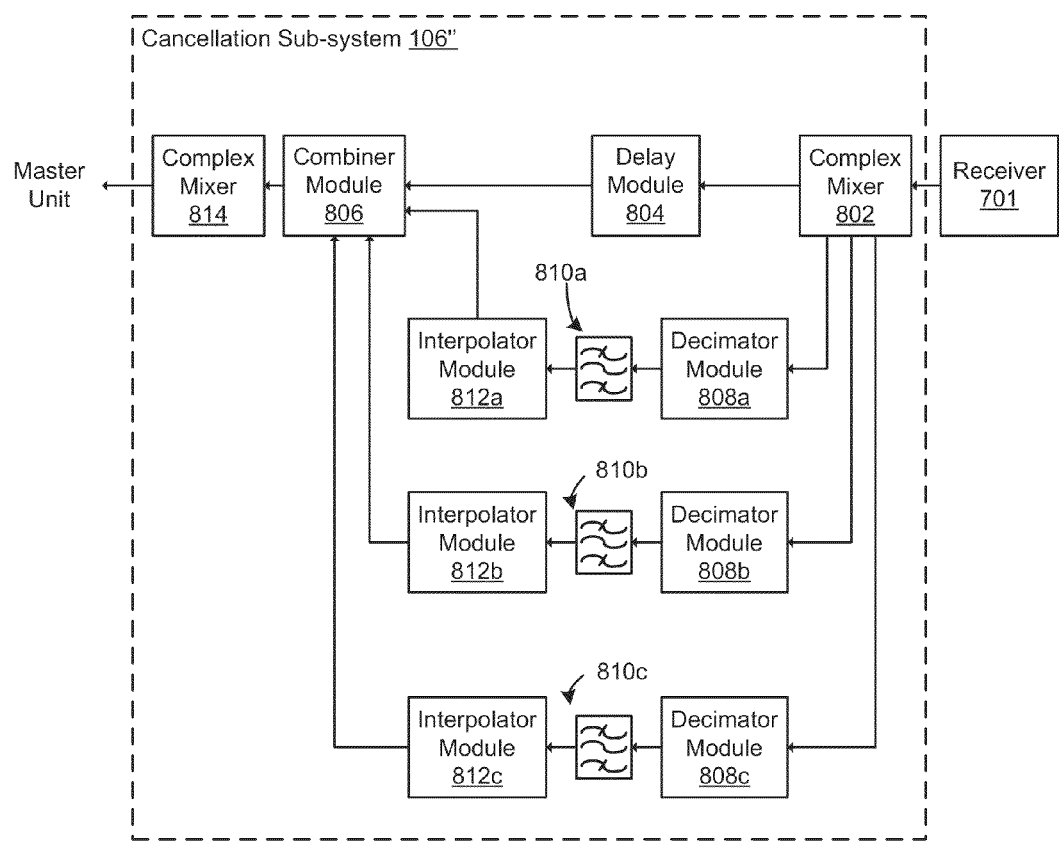
FIG. 10 is a block diagram depicting an alternative cancellation sub-system for cancelling multiple interfering signals according to one aspect of the present invention.

Although each of FIGS. 8-9 depicts a single reference path used to cancel a single interfering signal for descriptive purposes, other implementations are possible. In some aspects, a cancellation sub-system can remove multiple interfering signals within different frequency bands. FIG. 10 is a block diagram depicting an alternative cancellation sub-system 106" for cancelling multiple interfering signals according to one aspect. The cancellation sub-system 106" can include multiple reference paths. Each reference path can be a signal path parallel to the uplink path from the complex mixer 802 to the combiner module 806. The complex mixer 802 can provide a down-converted reference signal centered at 0 Hz to each of the reference paths. The reference paths can respectively include decimator modules 808*a-c*, filters 810*a-c*, and interpolator modules 812*a-c*. A respective reference signal can traverse each of the parallel reference paths. Each reference signal traversing a given reference path can be processed to generate a respective cancellation signal corresponding to a frequency band for a respective interfering signal. The combiner module 806 can subtract each of the cancellation signals from the uplink signal traversing the uplink path.

Figure 11:
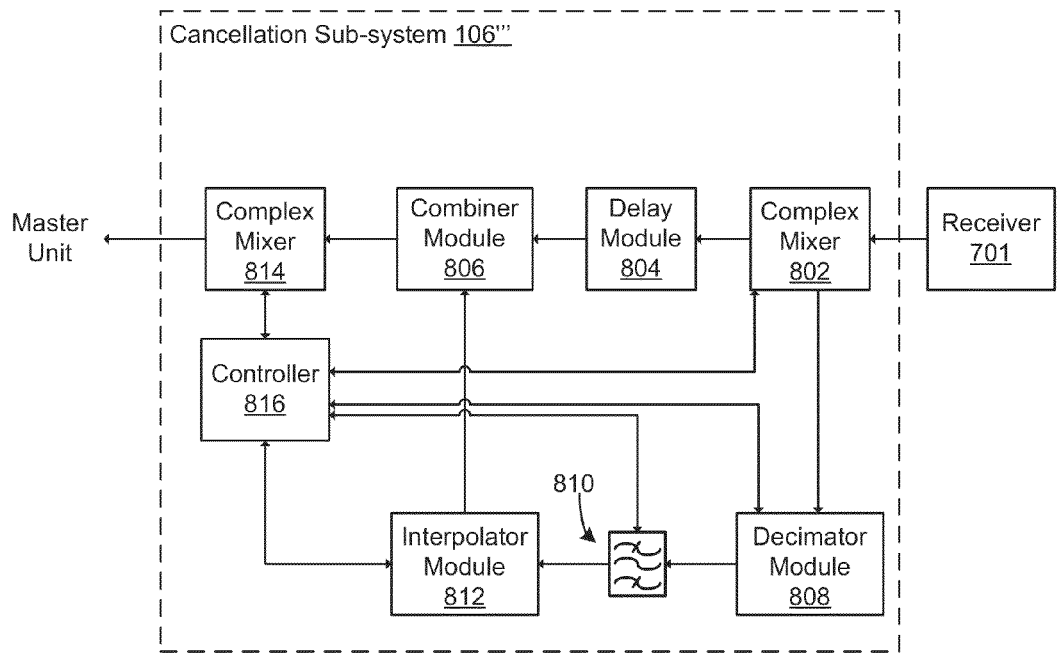
FIG. 11 is a block diagram depicting an alternative cancellation sub-system having a controller for configuring components of the cancellation sub-system.

In additional or alternative aspects, the cancellation sub-system can include a controller. For example, FIG. 11 is a block diagram depicting an alternative cancellation sub-system 106''' having a controller 818 for configuring components of the cancellation sub-system 106'''. The controller 818 can be communicatively coupled to one or more of the complex mixers 802, 814, the decimator module 808, the filter 810, and the interpolator module 812. The controller 818 can provide control signals to the controlled components to configure one or more parameters of the cancellation sub-system 106''' such that the cancellation signal generated by the cancellation sub-system 106''' corresponds to the frequency spectrum of the interfering signal. For example, the controller 818 can configure the conversion frequencies of the complex mixers 802, 814, the decimation rate of the decimator module 808, the pass band of the filter 810, and/or the interpolation rate of the interpolator module 812, interpolation rates. The controller 818 can include a processing device that can execute code stored on a computer-readable medium to cause the controller 818 to configure the cancellation sub-system 106. Non-limiting examples of a suitable processing device include a microprocessor, a peripheral interface controller ("PIC"), an application-specific integrated circuit ("ASIC"), a field-programmable gate array ("FPGA"), or other suitable processing device. The controller 818 may include a single processing device or any number of processing devices.

Figure 12:
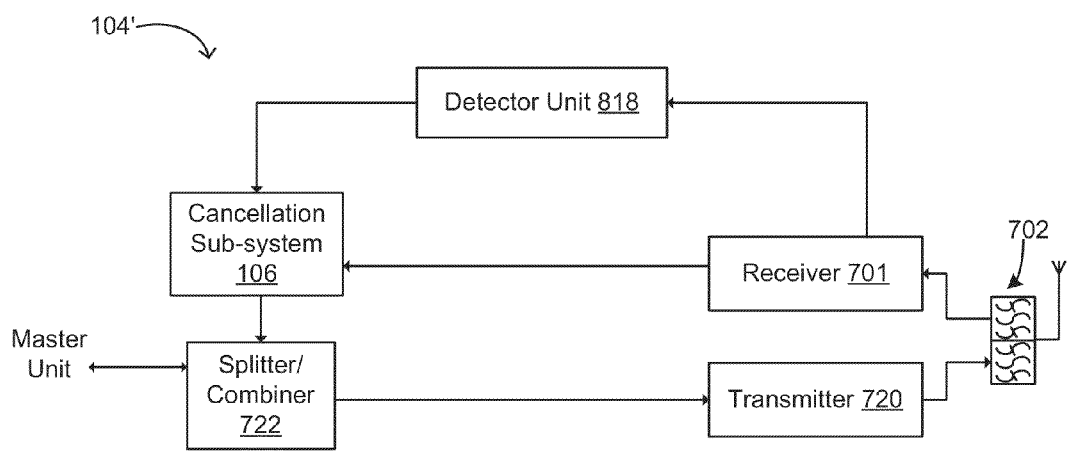
FIG. 12 is a block depicting an example remote antenna unit having a detection unit for use with a cancellation sub-system according to one aspect of the present invention.

In additional or alternative aspects, a remote antenna unit 104 can include a detector unit for detecting the interfering signal. FIG. 12 is a block depicting an example remote antenna unit 104' having a detection unit 818 for use with a cancellation subsystem 106 according to one aspect. The detector unit 818 can determine the frequency band of an interfering signal by analyzing the power spectrum of an uplink signal receiver by the remote antenna unit 104. A non-limiting example of a detector unit 818 is a programmable processing device, such as (but not limited to) an FPGA or an ASIC, that can execute an algorithm stored in memory. The detector unit 818 can receive the digital uplink signal from the receiver 701. The detector unit 818 can execute an algorithm analyzing the power of the components of the uplink signal.

In some aspects, the detection algorithm can be a clustering algorithm that identifies and plots the power level of each signal component of the uplink signal. The detector unit 818 can determine that no interfering signals are present in the uplink signal based on the power levels of the signal components being plotted in a single cluster. The power levels of the signal components being plotted in a single cluster can indicate that the signal components of the uplink signal have similar power levels. The detector unit 818 can determine that one or more interfering signals are present in the uplink signal based on the power levels of the signal components being plotted in multiple clusters. The power levels of the signal components being plotted in multiple clusters can indicate that one or more signal components of the uplink signal have different power levels than the desired uplink signal and are therefore interfering signal components.

In additional or alternative aspects, the detection algorithm can be an algorithm for generating an auto-regression model of the uplink signal received from the receiver 701. The detector unit 818 can determine that no interfering signal is present in the uplink signal based on the poles of the auto-regression model being evenly spaced. The detector unit 818 can determine that an interfering signal is present in the uplink signal based on the poles of the auto-regression model being clustered together.

The detector unit 818 can be communicatively coupled to the cancellation sub-system 106. The detector unit 818 can configure the cancellation sub-system 106 to cancel the interfering signal based on detecting the interfering signal. In some aspects, the detector unit 818 can be communicatively coupled directly to the decimator module 808, the filter 810, and the interpolator module 812. In other aspects, the detector unit 818 can be communicatively coupled a controller 818 of the cancellation sub-system that can configure the decimator module 808, the filter 810, and/or the interpolator module 812.

Figure 13:
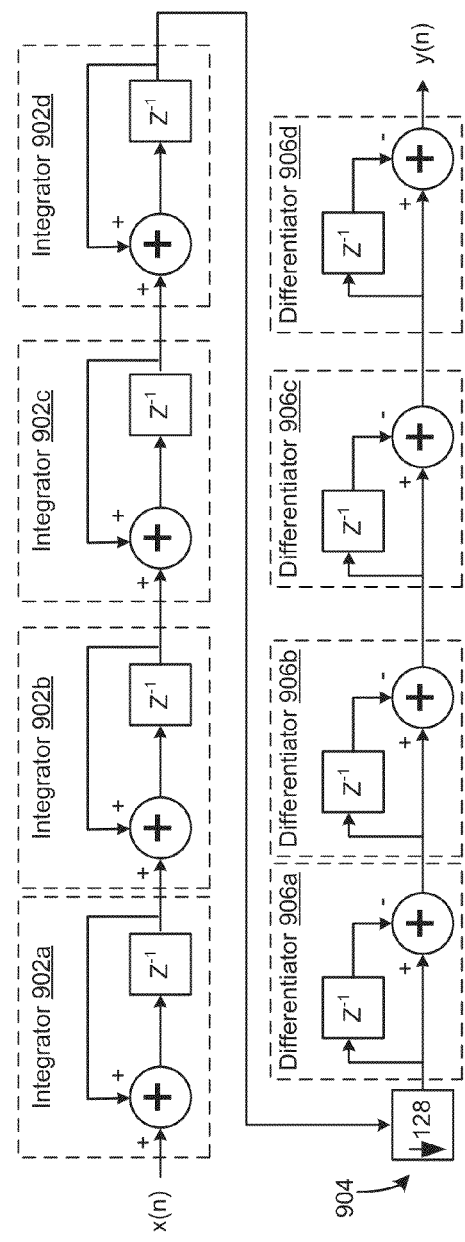
FIG. 13 is a modeling diagram depicting a cascaded integrator-comb ("CIC") decimation filter for a cancellation sub-system according to one aspect of the present invention.

In some aspects, the decimator module 808 and/or the interpolator module 812 can include cascaded integrator-comb ("CIC") filters for performing decimation and/or interpolation. For example, FIG. 13 is a modeling diagram depicting a CIC decimation filter 901 for the cancellation sub-system 106 according to one aspect. The CIC decimation filter 901 can include integrators 902*a-d*, decimation operator 904, and differentiators 906*a-d* to perform anti-aliasing filtering, decimation, and interpolation. The integrators 902*a-d* and differentiators 906*a-d* can respectively be implemented using adders and subtractors, as depicted in FIG. 13. The adders and subtractors can be implemented in any suitable processing device, such as (but not limited to) an FPGA, an ASIC, and the like.

A CIC filter can include parameters such as a CIC order, a differential delay, and a decimation amount M. For example, the example CIC filter depicted in FIG. 13 has a CIC order of four, a differential delay of one, and a decimation amount M of 128. The reference signal x(n) can be filtered to prevent aliasing prior to decimation. The aliasing bands may occur at integer multiples of $\pi/M$. For example, for a complex mixer having a sampling rate of the received signal for this example is of 99.84 MHz (i.e., 26× a WCDMA chip rate of 3.84 MHz), an anti-aliasing filter can reject spectral content at integer multiples of 99.84 MHz/128+/−120 kHz=780 kHz+/−120 kHz. The CIC filter can also have a magnitude response that includes a null at each one of the aliasing bands. The CIC decimation filter 901 can output the decimated reference signal y(n).

Figure 14:
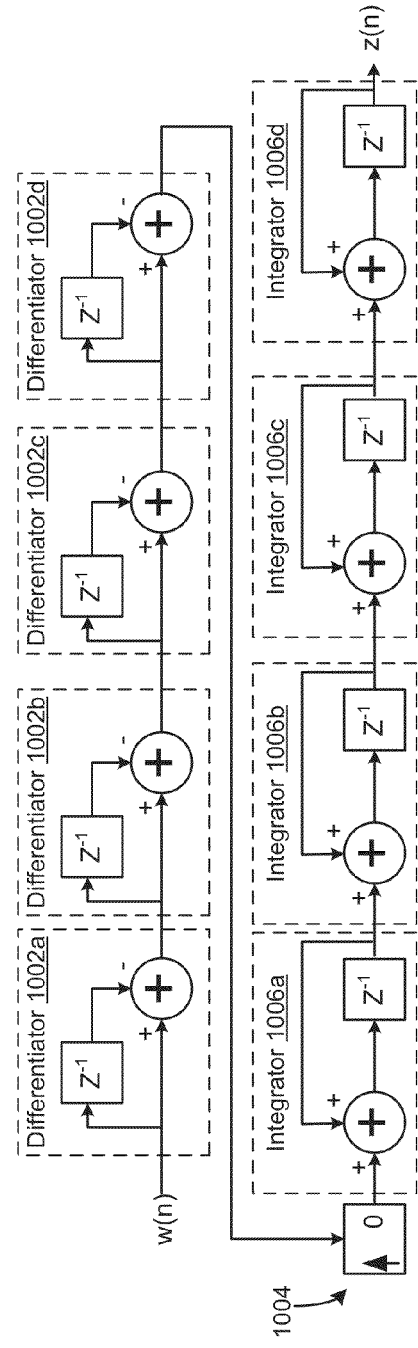
FIG. 14 is a modeling diagram depicting a CIC interpolation filter for a cancellation sub-system according to one aspect of the present invention.

FIG. 14 is a modeling diagram depicting a CIC interpolation filter 1001 for the cancellation sub-system 106 according to one aspect. The CIC interpolation filter 1001 can include differentiators 1002*a-d*, a zero-fill interpolation operator

1004, and integrators 1006-*d*. The differentiators 1002*a-d* and integrators 1006-*d* can respectively be implemented using adders and subtractors, as depicted in FIG. 14. The adders and subtractors can be implemented in any suitable processing device, such as (but not limited to) an FPGA, an ASIC, etc. The example CIC interpolation filter 1001 can include a CIC order of four, a differential delay of one, and a decimation amount M of zero. The CIC interpolation filter 1001 can receive a cancellation signal w(n) and output an interpolated cancellation signal z(n).

Figure 15:
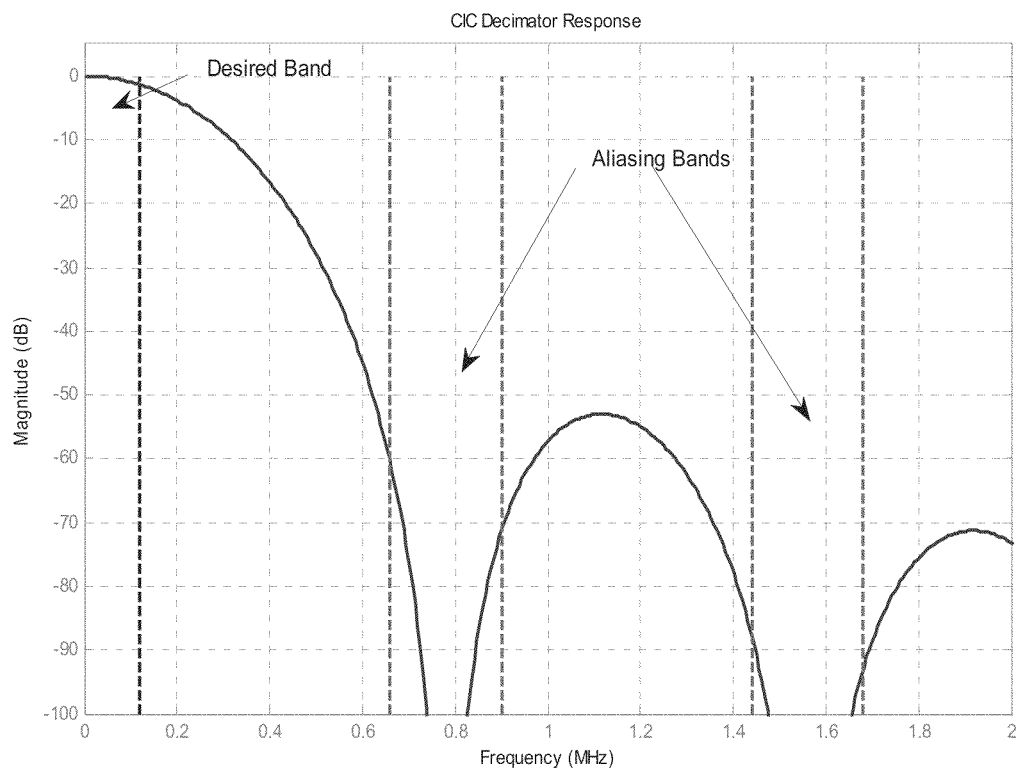
FIG. 15 is a graph depicting an example magnitude response of a cancellation sub-system having CIC decimation filter(s) for a reference path according to one aspect of the present invention.

FIG. 15 is a graph depicting an example magnitude response of a cancellation sub-system 106 having CIC decimation filter(s) 901 for a reference path according to one aspect. A CIC filter can have a response with a waveform similar to that of normalized sinc function with nulls at each frequency of $\pi$/M. A bandwidth of the CIC decimation filter can be selected that is similar or equal to the stop-band bandwidth of the filter 810. Aliasing outside of the bandwidth of the CIC decimation filter can be filtered by the filter 810. Aliasing within the pass-band of the filter 810 can be removed or reduced by the CIC decimation filter 901.

In some aspects, CIC filters may exhibit pass-band droop. For example, a desired bandwidth that is large in comparison to the decimated Nyquist bandwidth may result in an excessive amount of pass-band droop in the CIC filter. An excessive amount of droop in the pass-band can limit the amount of cancellation that can be achieved by the cancellation sub-system 106.

Figure 16:
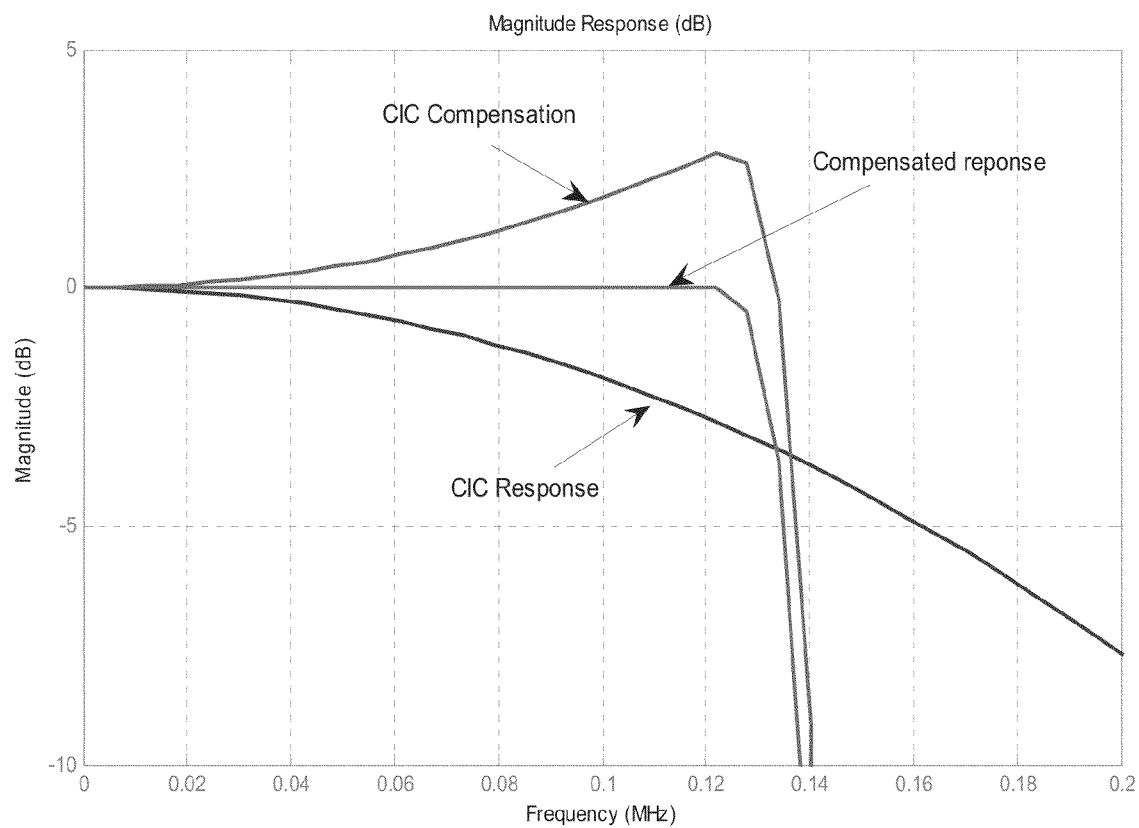
FIG. 16 is a graph depicting an example magnitude response of a cancellation sub-system having CIC droop compensation for the CIC decimation filter(s) according to one aspect of the present invention.

The droop of a CIC filter can be reduced by including an inverse sinc response in a filter 810. The inverse sinc response can be extended to the pass-band edge of the filter 810 using additional taps in the filter 810. FIG. 16 is a graph depicting an example magnitude response of a cancellation sub-system having 106 CIC droop compensation for the CIC decimation filter(s) 901 according to one aspect. FIG. 16 depicts the magnitude response of the CIC decimation filter 901 near the pass-band of the CIC decimation filter 901. The CIC response depicted in FIG. 16 is the cascade of the CIC decimation filter 901 and the CIC interpolation filter 1001. The pass-band droop is approximately 2.8 dB at a 120 kHz offset from center. FIG. 16 also depicts the inverse sinc response of the filter 810. The inverse sinc response of the filter 810 can apply extra gain at the bandpass edges of the filter 810 to compensate for the CIC filter droop. The reference path can have a flat response to the edges of the pass band of the filter 810.

Figure 17:
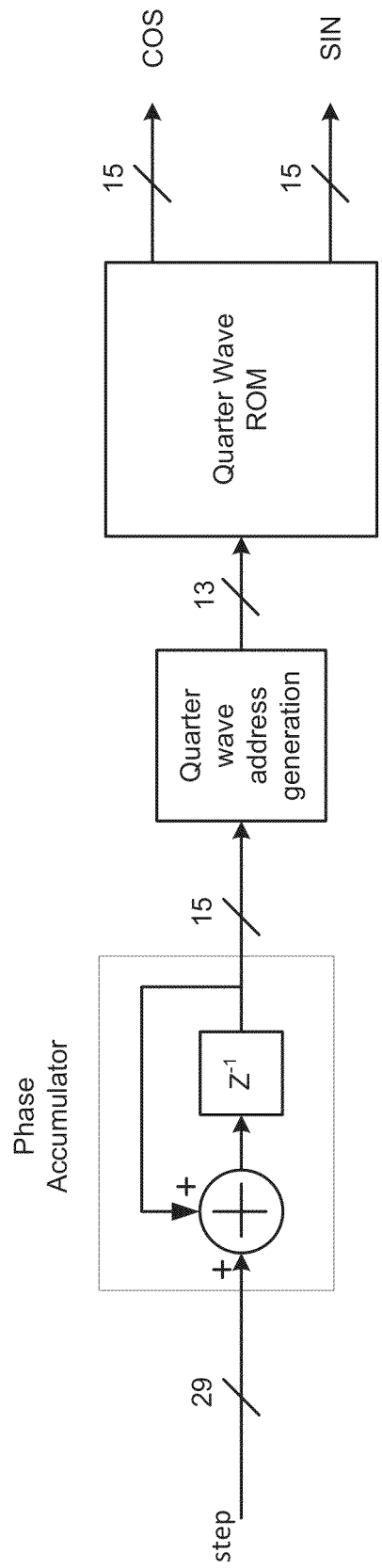
FIG. 17 is block diagram depicting a numerically controlled oscillator used with a cancellation sub-system according to one aspect of the present invention.

In some aspects, a digital mixing operation implemented by the cancellation sub-system 106 can include generating a digital local oscillation signal that can be tuned to a frequency in the pass-band of the receiver 701. For example, a numerically controlled oscillator ("NCO") can generate a complex local oscillation used for mixing. FIG. 17 is block diagram depicting a numerically controlled oscillator used with a cancellation sub-system 106 according to one aspect. FIG. 17 depicts two mixing operations that can occur in down conversion and up conversion. The up-conversion mixing operation can use the same frequency and opposite sign as the down conversion mixing operation. For example, if intermodulation interference is located at a 1 MHz offset from band center, a down conversion local oscillator can be tuned to a frequency of −1 MHz and an up-conversion local oscillator can be tuned to a +1 MHz frequency. The down conversion local oscillator and up-conversion local oscillator can be tuned by generating one complex local oscillation signal and using the complex conjugate of the one complex local oscillation signal to generate the positive and negative frequency. The complex conjugate of the local oscillation signal can be obtained by multiplying the sine output of the NCO depicted in FIG. 17.

Figure 19:
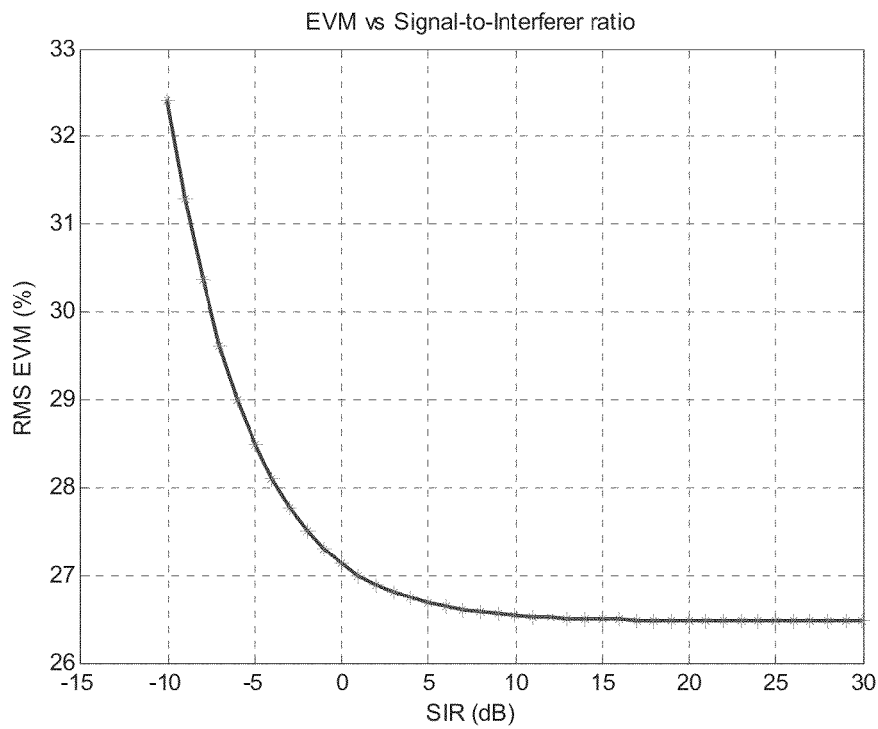
FIG. 19 is a graph depicting example RMS error vector magnitudes versus signal-to-interferer ratios for cancellation sub-system using notch filtering according to one aspect of the present invention.
Figure 20:
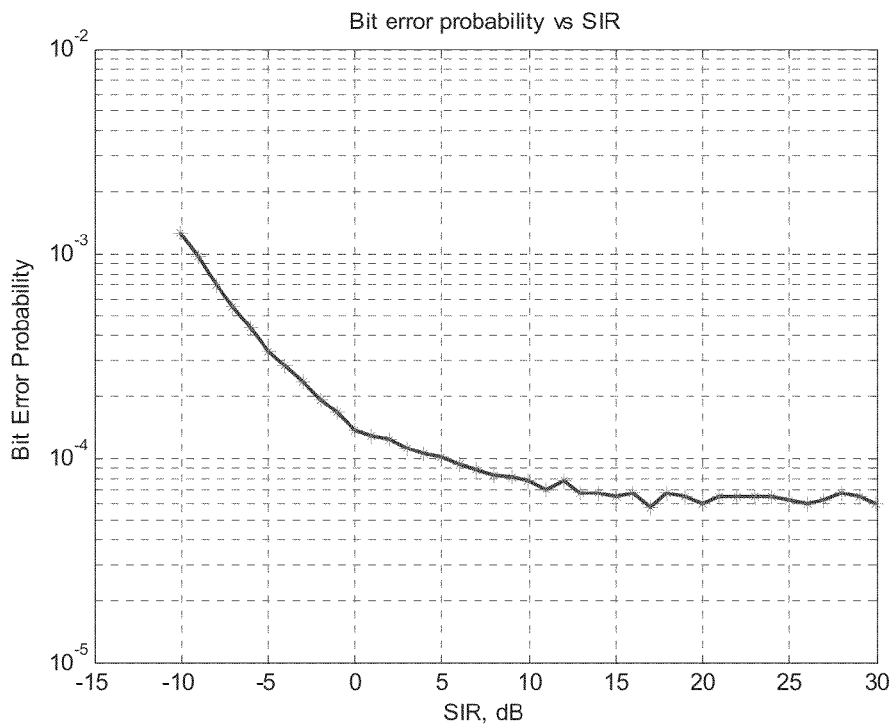
FIG. 20 is a graph depicting example bit error probabilities versus signal-to-interferer ratios for cancellation sub-system using notch filtering according to one aspect of the present invention.

FIG. 18 is a table depicting example bit error probabilities and RMS error vector magnitudes associated with different signal-to-interferer ratios for a cancellation sub-system 106 according to one aspect. The filter 810 used for the example data depicted in FIG. 18 can have an order of 127 operating at a decimated sampling rate of 780 kHz, a 120 kHz pass band, and a 150 kHz stop band with stop-band attenuation of is 80 dB. A signal that is in the pass-band of filter 810 can be subtracted from the uplink signal traversing the uplink path. FIG. 19 is a graph depicting the example RMS error vector magnitudes from the table in FIG. 18. FIG. 20 is a graph depicting example bit error probabilities from the table in FIG. 18.

Figure 21:
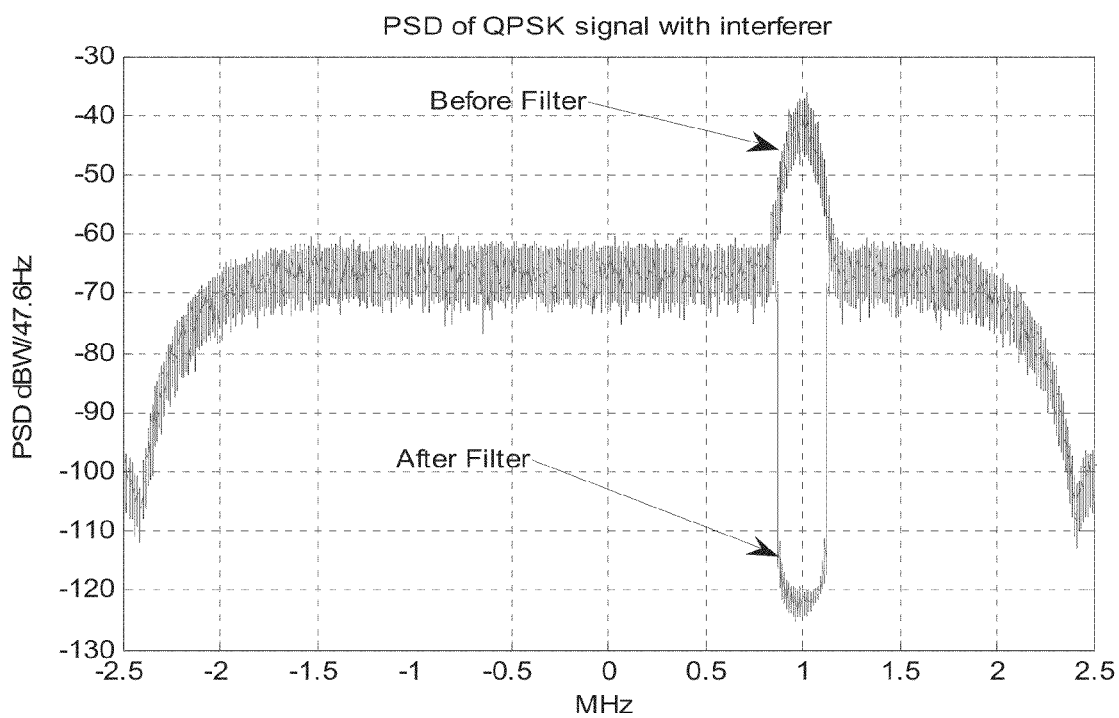
FIG. 21 is a graph depicting an example power spectral density of an uplink signal having an interfering signal before and after cancellation of the interfering signal according to one aspect of the present invention.
Figure 22:
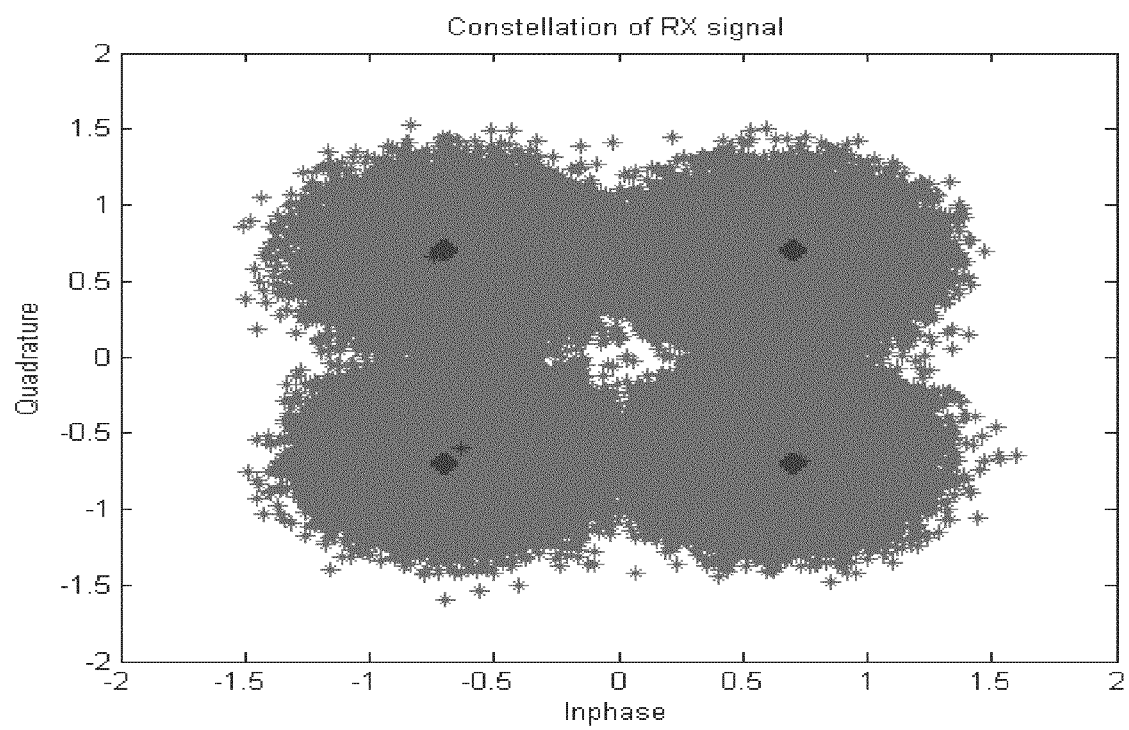
FIG. 22 is a constellation diagram of an uplink signal after cancelling an interfering signal according to one aspect of the present invention.

FIG. 21 is a graph depicting an example power spectral density of an uplink signal having an interfering signal before and after cancellation of the interfering signal. FIG. 22 is a constellation diagram of the uplink signal after cancelling the interfering signal.

The foregoing description of aspects and features of the invention, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other example. The illustrative examples described above are given to introduce the reader to the general subject matter discussed here and are not intended to limit the scope of the disclosed concepts.

What is claimed is:

1. A cancellation sub-system for canceling narrowband interfering signal components in a remote antenna unit of a distributed antenna system, the cancellation sub-system comprising:
   a decimator module configured for decimating a reference signal including a narrowband interfering signal component and sampled from an uplink signal including the narrowband interfering signal component and traversing an uplink path of the remote antenna unit;
   a filter communicatively coupled to the decimator module and configured for generating a cancellation signal from the reference signal by attenuating frequency components of the reference signal using a passband corresponding to a frequency band that includes the narrowband interfering signal component;
   an interpolator module communicatively coupled to the filter and configured for interpolating the cancellation signal to a sampling rate of the uplink signal traversing the uplink path; and
   a combiner module communicatively coupled to the uplink path and a reference path in parallel with the uplink path, wherein the reference path comprises the decimator module, the filter, and the interpolator module, wherein the combiner module is configured to subtract the cancellation signal traversing the reference path from the uplink signal traversing the uplink path.

2. The cancellation sub-system of claim 1, further comprising:
   a first complex mixer communicatively coupled to a receiver of the remote antenna unit and the decimator module, wherein the first complex mixer is configured for shifting a center frequency of the reference signal from an initial center frequency at an input of the first complex mixer to zero hertz; and
a second complex mixer communicatively coupled to the combiner module and configured to shift a center frequency of the uplink signal outputted from the combiner module to the initial center frequency.

3. The cancellation sub-system of claim 2, wherein the first complex mixer and the second complex mixer are disposed in the uplink path.

4. The cancellation sub-system of claim 2, wherein the first complex mixer and the second complex mixer are disposed in the reference path in parallel with the uplink path.

5. The cancellation sub-system of claim 2, further comprising:
an additional reference path in parallel with the uplink path and the reference path, wherein the additional reference path comprises:
an additional decimator module configured for decimating an additional reference signal, wherein the additional reference signal is sampled from the uplink signal including the narrowband interfering signal component;
an additional filter communicatively coupled to the additional decimator module and configured for generating an additional cancellation signal from the reference signal by attenuating frequency components of the additional reference signal using an additional passband corresponding to an additional frequency band that includes an additional narrowband interfering signal component, wherein the frequency band that includes the narrowband interfering signal component is different from the frequency band that includes the additional narrowband interfering signal component, and
an additional interpolator module communicatively coupled to the filter and configured for interpolating the additional cancellation signal to the sampling rate of the uplink signal traversing the uplink path;
wherein the combiner module is communicatively coupled to the additional reference path and is configured to subtract the additional cancellation signal from the uplink signal traversing the uplink path.

6. A remote antenna unit configured for canceling narrowband interfering signal components in a distributed antenna system, the remote antenna unit comprising:
a receiver configured to receive an uplink signal traversing an uplink path of the remote antenna unit;
a cancellation sub-system communicatively coupled to the receiver, the cancellation sub-system comprising:
a decimator module configured for decimating a reference signal including a narrowband interfering signal component and sampled from an uplink signal including the narrowband interfering signal component and traversing an uplink path of the remote antenna unit,
a filter communicatively coupled to the decimator module and configured for generating a cancellation signal from the reference signal by attenuating frequency components of the reference signal using a passband corresponding to a frequency band that includes the narrowband interfering signal component,
an interpolator module communicatively coupled to the filter and configured for interpolating the cancellation signal to a sampling rate of the uplink signal traversing the uplink path, and
a combiner module communicatively coupled to the uplink path and a reference path in parallel with the uplink path, wherein the reference path comprises the decimator module, the filter, and the interpolator module, wherein the combiner module is configured to subtract the cancellation signal traversing the reference path from the uplink signal traversing the uplink path.

7. The remote antenna unit of claim 6, further comprising a detection unit communicatively coupled to the receiver and the cancellation sub-system, wherein the detection unit is configured for:
detecting the narrowband interfering signal component;
determining the frequency band that includes the narrowband interfering signal component; and
configuring the cancellation sub-system with the frequency band that includes the narrowband interfering signal component.

8. The remote antenna unit of claim 7, wherein the detection unit is configured for detecting the narrowband interfering signal component by:
determining a distribution of power levels for a plurality of signal components of the uplink signal; and
determining that the uplink signal includes the narrowband interfering signal component based on a spacing of the distribution of power levels.

9. The remote antenna unit of claim 7, wherein the detection unit is configured for detecting the narrowband interfering signal component by:
generating an auto-regression model of the uplink signal comprising a plurality of poles; and
determining that the uplink signal includes the narrowband interfering signal component based on a spacing of the plurality of poles.

10. The remote antenna unit of claim 6, further comprising:
a first complex mixer communicatively coupled to the receiver and the decimator module, wherein the first complex mixer is configured for shifting a center frequency of the reference signal from an initial center frequency at an input of the first complex mixer to zero hertz; and
a second complex mixer communicatively coupled to the combiner module and configured to shift a center frequency of the uplink signal outputted from the combiner module to the initial center frequency.

11. The remote antenna unit of claim 10, wherein the first complex mixer and the second complex mixer are disposed in the uplink path.

12. The remote antenna unit of claim 10, wherein the first complex mixer and the second complex mixer are disposed in the reference path in parallel with the uplink path.

13. The remote antenna unit of claim 6, wherein the cancellation sub-system further comprises:
an additional reference path in parallel with the uplink path and the reference path, wherein the reference path comprises:
an additional decimator module configured for decimating an additional reference signal, wherein the additional reference signal is sampled from the uplink signal including the narrowband interfering signal component;
an additional filter communicatively coupled to the additional decimator module and configured for generating an additional cancellation signal from the reference signal by attenuating frequency components of the additional reference signal using an additional passband corresponding to an additional frequency band that includes an additional narrowband interfering signal component, wherein the frequency band that includes the narrowband interfering signal component is different from the frequency band that includes the additional narrowband interfering signal component, and an additional interpolator module communicatively coupled to the filter and configured for interpolating the additional cancellation signal to the sampling rate of the uplink signal traversing the uplink path;

wherein the combiner module is communicatively coupled to the additional reference path and is configured to subtract the additional cancellation signal from the uplink signal traversing the uplink path.

14. The remote antenna unit of claim 6, wherein at least one of the decimator module and the interpolator module comprises a cascaded integrator-comb filter.

15. A method for canceling narrowband interfering signal components in a remote antenna unit of a distributed antenna system, the method comprising:

receiving, by a receiver of the remote antenna unit, an uplink signal traversing an uplink path of the remote antenna unit;

decimating a reference signal including a narrowband interfering signal component and sampled from an uplink signal including the narrowband interfering signal component and traversing an uplink path of the remote antenna unit;

generating a cancellation signal from the reference signal by attenuating frequency components of the reference signal using a passband corresponding to a frequency band that includes the narrowband interfering signal component;

interpolating the cancellation signal to a sampling rate of the uplink signal traversing the uplink path, and subtracting the cancellation signal from the uplink signal.

16. The method of claim 15, further comprising:

shifting a center frequency of the reference signal and a center frequency of the uplink signal from an initial center frequency to zero hertz prior to decimating the reference signal; and shifting the center frequency of the uplink signal to the initial center frequency after subtracting the cancellation signal from the uplink signal.

17. The method of claim 15, further comprising:

shifting a center frequency of the reference signal from an initial center frequency to zero hertz prior to decimating the reference signal; and shifting a center frequency of the cancellation signal to the initial center frequency prior to subtracting the cancellation signal from the uplink signal.

18. The method of claim 15, comprising:

decimating an additional reference signal, wherein the additional reference signal is sampled from the uplink signal including the narrowband interfering signal component;

generating an additional cancellation signal from the additional reference signal by attenuating frequency components of the additional reference signal using an additional passband corresponding to an additional frequency band that includes an additional narrowband interfering signal component, wherein the frequency band that includes the narrowband interfering signal component is different from the frequency band that includes the additional narrowband interfering signal component;

interpolating the additional cancellation signal to the sampling rate of the uplink signal traversing the uplink path; and subtracting the additional cancellation signal from the uplink signal.

19. The method of claim 15, further comprising detecting the narrowband interfering signal component, wherein detecting the narrowband interfering signal component comprises:

determining a distribution of power levels for a plurality of signal components of the uplink signal; and determining that the uplink signal includes the narrowband interfering signal component based on a spacing of the distribution of power levels.

20. The method of claim 15, further comprising detecting the narrowband interfering signal component, wherein detecting the narrowband interfering signal component comprises:

generating an auto-regression model of the uplink signal comprising a plurality of poles; and determining that the uplink signal includes the narrowband interfering signal component based on a spacing of the plurality of poles.

\* \* \* \* \*